United States Patent
Chakraborty et al.

(10) Patent No.: US 10,005,067 B2
(45) Date of Patent: Jun. 26, 2018

(54) USE OF CATALYSTS, METHOD AND APPARATUS FOR SELECTIVE OXIDATION OF AMMONIA IN A GAS CONTAINING HYDROGEN

(71) Applicant: Danmarks Tekniske Universitet, Kgs. Lyngby (DK)

(72) Inventors: Debasish Chakraborty, Copenhagen S (DK); Ib Chorkendorff, Birkerød (DK); Jakob Lind Olsen, Copenhagen S (DK); Hugo José Lopes Silva, Kgs. Lyngby (DK); Morten Godtfred Nielsen, Dyssegård (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days. days.

(21) Appl. No.: 15/310,264

(22) PCT Filed: May 26, 2015

(86) PCT No.: PCT/DK2015/050131
§ 371 (c)(1),
(2) Date: Nov. 10, 2016

(87) PCT Pub. No.: WO2015/180728
PCT Pub. Date: Dec. 3, 2015

(65) Prior Publication Data
US 2017/0157593 A1 Jun. 8, 2017

(30) Foreign Application Priority Data

May 27, 2014 (EP) .................... 14169994

(51) Int. Cl.
| | | |
|---|---|---|
| *C01B 3/04* | (2006.01) | |
| *B01J 8/00* | (2006.01) | |
| *B01D 53/58* | (2006.01) | |
| *B01D 53/81* | (2006.01) | |
| *B01J 23/30* | (2006.01) | |
| *B01J 37/03* | (2006.01) | |
| *B01J 37/16* | (2006.01) | |
| *B01J 21/06* | (2006.01) | |
| *B01J 23/10* | (2006.01) | |
| *B01J 23/22* | (2006.01) | |
| *B01J 23/26* | (2006.01) | |
| *B01J 23/28* | (2006.01) | |
| *B01J 23/34* | (2006.01) | |
| *B01J 37/02* | (2006.01) | |
| *B01D 53/86* | (2006.01) | |
| *B01D 53/94* | (2006.01) | |

(52) U.S. Cl.
CPC .......... *B01J 23/30* (2013.01); *B01D 53/8634* (2013.01); *B01D 53/9436* (2013.01); *B01J 8/00* (2013.01); *B01J 21/06* (2013.01); *B01J 21/063* (2013.01); *B01J 23/10* (2013.01); *B01J 23/22* (2013.01); *B01J 23/26* (2013.01); *B01J 23/28* (2013.01); *B01J 23/34* (2013.01); *B01J 37/0201* (2013.01); *B01J 37/0203* (2013.01); *B01J 37/036* (2013.01); *B01J 37/16* (2013.01); *C01B 3/047* (2013.01); *B01D 2251/102* (2013.01); *B01D 2255/20723* (2013.01); *B01D 2255/20769* (2013.01); *B01D 2255/20776* (2013.01); *B01D 2255/20784* (2013.01); *B01D 2256/16* (2013.01); *B01D 2257/406* (2013.01); *B01J 2219/00002* (2013.01)

(58) Field of Classification Search
CPC . C01B 3/047; C01B 53/8634; B01D 2256/16; B01D 2257/406; B01D 53/9436; B01D 2256/10; B01D 53/58; B01D 53/81; B01J 2219/00002; B01J 8/00
See application file for complete search history.

(56) References Cited

U.S. PATENT DOCUMENTS

| | | | |
|---|---|---|---|
| 4,003,978 A | 1/1977 | Shiraishi et al. | |
| 4,138,469 A * | 2/1979 | Kato .................. | B01D 53/8628 423/239.1 |
| 8,242,049 B2 * | 8/2012 | Yeung ................ | B01D 53/8634 423/235 |
| 8,722,011 B2 * | 5/2014 | Hikazudani ............. | C01B 3/047 123/3 |
| 2011/0176988 A1 | 7/2011 | Okamura et al. | |

(Continued)

FOREIGN PATENT DOCUMENTS

| | | |
|---|---|---|
| EP | 2 612 706 A1 | 7/2013 |
| EP | 2 796 198 A1 | 10/2014 |
| WO | WO 01/87770 A1 | 11/2001 |

(Continued)

OTHER PUBLICATIONS

Amores, JoséManuel Gallardo et al., "An FT-IR study of ammonia adsorption and oxidation over anatase-supported metal oxides" Applied Catalysis B: Environmental, 1997, pp. 45-58, vol. 13.

(Continued)

*Primary Examiner* — Timothy C Vanoy
(74) *Attorney, Agent, or Firm* — Knobbe Martens Olson & Bear LLP (57) ABSTRACT

The invention contributes to a cost effective way to solve the problem of trace ammonia removal from a hydrogen and nitrogen containing gas. The set of catalysts of the invention selectively oxidized ammonia in ppm concentration even in gas mixtures containing hydrogen gas in concentrations of three orders of magnitude higher than the concentration of ammonia.

16 Claims, 10 Drawing Sheets

(56) References Cited

U.S. PATENT DOCUMENTS

2013/0156687 A1     6/2013    Araki et al.

FOREIGN PATENT DOCUMENTS

| WO | WO 2010-116874 A2 * | 10/2010 | ............ B01J 8/0221 |
| WO | WO 2011/107279 A1 | 9/2011 | |

OTHER PUBLICATIONS

Darvell, L.I. et al., "An investigation of alumina-supported catalysts for the selective catalytic oxidation of ammonia in biomass gasification" Catalysis Today, 2003, pp. 681-692, vol. 81.

Engweiler, J. et al., "Chromia Supported on Titania—II. Morphological Properties and Catalytic Behavior in the Selective Reduction of Nitric Oxide by Ammonia" Journal of Catalysis, 1994, pp. 141-150, vol. 145.

Pérez-Ramírez, Javier et al., "Mechanism of ammonia oxidation over oxides studied by temporal analysis of products" Journal of Catalysis, 2007, pp. 240-246, vol. 250.

Schneider, H. et al., "Chromia on Titania—IV. Nature of Active Sites for Selective Catalytic Reduction of NO by $NH_3$" Journal of Catalysis, 1994, pp. 545-556, vol. 147.

Tunå, PER et al., "Selective Catalytic Oxidation of Ammonia by Nitrogen Oxides in a Model Synthesis Gas" Fuel, Mar. 2013, pp. 331-337, vol. 105.

Wang, Wentao et al., "Ammonia as hydrogen carrier for transportation; investigation of the ammonia exhaust gas fuel reforming" International Journal of Hydrogen Energy, 2013, pp. 9907-9917, vol. 38.

International Search Report for PCT/DK2015/050131 dated Apr. 28, 2016.

Tamm, Stefanie et al., The Effect of the Gas Composition on Hydrogen-Assisted $NH_3$-SCR Over $Ag/Al_2O_3$; Applied Catalysis B: Environmental, 2013; p. 168-176, Elsevier B.V.

* cited by examiner

FIG. 14

USE OF CATALYSTS, METHOD AND APPARATUS FOR SELECTIVE OXIDATION OF AMMONIA IN A GAS CONTAINING HYDROGEN

CROSS REFERENCE TO RELATED APPLICATIONS

This application is a U.S. National Phase Application of PCT International Application Number PCT/DK2015/050131, filed on May 26, 2015, designating the United States of America and published in the English language, which is an International Application of and claims the benefit of priority to European Patent Application No. 14169994.2, filed on May 27, 2014. The disclosures of the above-referenced applications are hereby expressly incorporated by reference in their entireties.

FIELD OF THE INVENTION

The present invention relates to catalysts that selectively remove ammonia in gas mixtures containing hydrogen gas.

BACKGROUND OF THE INVENTION

Hydrogen gas is a crucial source of energy, chemically stored in the hydrogen bond, as by far it is the best fuel for proton exchange membrane fuel cells (PEMFC). However, hydrogen gas is difficult to store especially during transportation due to its low energy density per volume and thus hydrogen storage is one of the main challenges in the introduction of fuel cell based power generation.

Ammonia is a carbon free high density hydrogen carrier that does not emit any carbon when decomposed. Only nitrogen, hydrogen and water gases are generated by the decomposition of ammonia.

Ammonia cannot be fed directly to state of the art low temperature fuel cells because ammonia oxidation is extremely slow and inefficient. However, ammonia can be decomposed in a high temperature reactor to generate hydrogen gas.

Unfortunately, the hydrogen gas mixture produced by decomposition of ammonia unavoidably present a concentration of ammonia between few thousand to few parts per million (ppm) of ammonia, due to the nature of the decomposition reaction, i.e. an endothermic equilibrium controlled reaction.

Low temperature fuel cells, e.g. PEMFC, are very susceptible to the ammonia presence in their feed as even the presence of few ppm of ammonia deteriorates the performance of the fuel cell.

Thus, trace amounts of ammonia must be removed from hydrogen gas mixtures in order to use the gas mixtures as a feed for low temperature fuel cells.

A current method for separating traces of ammonia from a fuel cell feed is one that involves the use of a noble metal membrane. The fuel cell feed is flowed through a thin palladium based membrane that separates the ammonia from the hydrogen gas. However, this membrane has the drawback that palladium is very expensive and the membrane produced lack stability. Furthermore, in order to generate a reasonable flow of hydrogen gas, the gas pressure at the inlet side of the membrane has to reach high values, e.g. higher than 8 bar. These values require that the apparatus involved have to withstand high pressure, significantly increasing the costs. In some cases, e.g. when ammonia is released from a metal ammine type solid ammonia storage, these high values are not reachable making the use of a palladium membrane impossible.

Hence, an improved method for separating ammonia from hydrogen gas in hydrogen containing gas mixtures would be advantageous, and in particular a more efficient and/or reliable system for removing ammonia from hydrogen gas in hydrogen containing gas mixtures would be advantageous.

OBJECT OF THE INVENTION

It is an object of the invention to provide a method for separating and thus removing ammonia from gas mixtures comprising hydrogen and ammonia gas in ppm concentrations.

It is an object of the invention to provide a system for removing ammonia from gas mixtures containing hydrogen and nitrogen and ammonia gas in ppm concentrations.

SUMMARY OF THE INVENTION

The above described object and several other objects are intended to be obtained by providing a catalyst having a high selectivity towards ammonia oxidation even when the ammonia is present in a very low concentration, e.g. few ppm, and within a gas mixture comprising a high concentration of hydrogen gas, e.g. nearly 75% (vol %).

The catalyst of the invention selectively oxidises ammonia in ppm concentrations even in gas mixtures containing hydrogen gas in concentrations of three orders of magnitude higher than the concentration of ammonia.

By flowing a gas mixture containing hydrogen gas and trace amounts of ammonia over the catalyst, the traces of ammonia are reduced or removed below the equilibrium concentration of ammonia in the gas mixture, thus providing a gas mixture that can be used as a feed for low temperature fuel cells.

Thus, in a first aspect, the invention provides a catalyst comprising at least one transition metal element for selectively removing ammonia from gas mixtures comprising hydrogen and ammonia gas in ppm concentration.

Thus is some embodiments the catalyst is used alone without support.

For example, the catalyst may be produced as a pellet having a high surface area. This has the advantage of avoiding the need of a support to increase the surface area and thus reduce the costs and steps involved in the production of the catalyst.

In some embodiments the unsupported catalyst could be pressed to form pellets and crushed and sieved to certain sizes before testing.

In some embodiments, the invention provides a catalyst comprising at least one transition metal element for selectively removing ammonia from gas mixtures comprising hydrogen and nitrogen and ammonia gas in ppm concentration.

In some other embodiments, the invention provides a catalyst comprising at least one transition metal element for selectively removing ammonia from gas mixtures containing hydrogen and ammonia gas in ppm concentration.

In some further embodiments, the invention provides a catalyst comprising at least one transition metal element for selectively removing ammonia from gas mixtures containing hydrogen and nitrogen and ammonia gas in ppm concentration.

In some embodiments according to the first aspect the at least one transition metal element is a transition metal of the group VA and VIA according to the old IUPAC denomination, now denominated group 5 and 6, or a combination thereof.

In some further embodiments the at least one transition metal element is Cr, Mo, W, V or a combination thereof.

The transition metals of the group VA and VIA have shown a peculiar activity and selectivity towards ammonia oxidation even in presence of high concentrations of hydrogen gas and nitrogen gas. In particular Cr, Mo, W and V have shown very good activity towards ammonia oxidation.

In some embodiments the catalyst is supported on a support, thus the at least one transition metal element is supported on a support.

The support may be a metal oxide. The metal oxide of the support may comprise metals of the group IVB or VB. For example, the support may be titanium dioxide or zirconium oxide.

The support may have the function of carrier for the transition metal elements. The crystal structure and/or composition and/or porosity of the carrier may influence the performance of the catalyst, i.e. its selectivity towards the oxidation of ammonia gas in a gas mixture containing hydrogen.

In some other embodiments, the support is zeolite or titania.

As mentioned above the support may play an active role in increasing activity and selectivity towards ammonia oxidation.

For example, zeolite may have the advantage of having an optimal porosity.

In some other embodiments, the support is alumina or zirconia or ceria.

In some embodiments, the support may be a mixture of the different metal oxides above.

In a second aspect, the invention relates to the use of a catalyst, in selectively removing ammonia from a gas mixture comprising hydrogen, and ammonia gases.

In some embodiments of the second aspect, the invention relates to the use of a catalyst, in selectively removing ammonia from a gas mixture comprising hydrogen, nitrogen and ammonia gases.

The gas mixtures may contain hydrogen and ammonia gas in ppm concentration, or may contain hydrogen and nitrogen and ammonia gas in ppm concentration.

Thus, in one aspect the invention relates to the use of a catalyst comprising Cr, Mo, W, V or a combination thereof for selectively removing ammonia from gas mixtures comprising hydrogen and ammonia gas in ppm concentration, in selectively removing ammonia from a gas mixture comprising hydrogen and ammonia gases and containing ammonia in ppm concentration.

In a third aspect, the invention relates to the use of a catalyst, in selectively removing ammonia from a gas mixture comprising hydrogen and ammonia gases below the equilibrium concentration of ammonia.

The gas mixture may comprise also nitrogen gas.

Generally, ammonia dissociation in an ammonia decomposition unit produces hydrogen, nitrogen and ammonia gases.

This occurs according to the reaction of equilibrium in the gaseous state.

The equation for the reaction $$2NH_{3(gas)} \leftarrow 3H_{2(gas)} + N_{2(gas)} \quad (1)$$

is in equilibrium with the opposite reaction:

$$2NH_{3(gas)} \leftarrow 3H_{2(gas)} + N_{2(gas)} \quad (2)$$

The reaction equilibrium constant is:

$$Kc = \frac{[N_2][H_2]^3}{[NH_3]^2}$$

The equilibrium constant Kc depends on the temperature, thus the equilibrium concentrations may be shifted by increasing or decreasing the temperature. The catalyst of the invention is able to selectively remove ammonia from a gas mixture comprising hydrogen and nitrogen and ammonia gases below the equilibrium concentration of ammonia at the given temperature.

In particular, in some embodiments according to the third aspect of the invention, the invention relates to the use of a catalyst in selectively removing ammonia from a gas mixture having a composition of at least 75% (vol %) of hydrogen gas and containing ammonia in ppm concentration.

Gas mixture percentage (%) is herein defined as vol %.

In some embodiments, the gas mixture may have a composition of at least 25% of hydrogen gas, such as between 25 and 50% of hydrogen gas. The concentration of ammonia in ppm concentration may be lower than 1000 ppm, such as lower than 500 ppm, e.g. between a 10 and 500 ppm.

In a forth aspect, the invention relates to the use of a catalyst, in selectively removing ammonia from a gas mixture having a composition of 3:1 hydrogen to nitrogen ratio and containing ammonia in ppm concentration.

The hydrogen to nitrogen gas ratio is defined as in volume, i.e. 3:1 hydrogen gas to nitrogen gas ratio means that hydrogen gas is three times the volume of nitrogen gas.

In a fifth aspect of the invention, the invention relates to an apparatus for producing gas mixtures containing hydrogen, the apparatus comprising: a catalyst for decomposing ammonia; and, a catalyst for oxidizing ammonia.

For example, the apparatus for producing a gas mixture comprising hydrogen and nitrogen gas may comprise:
    an ammonia decomposition unit comprising a catalyst for decomposing ammonia;
    an ammonia oxidizing unit comprising a catalyst for oxidizing ammonia, wherein the catalyst for oxidizing ammonia is a catalyst according to the first aspect of the invention.

The ammonia oxidizing unit oxidize the ammonia present in the gas mixture containing hydrogen and nitrogen gas originated in the ammonia decomposition unit.

Thus in some embodiments the ammonia oxidizing unit is located downstream of the ammonia decomposition unit.

Downstream is defined as downstream in relation to the direction flow of the gas feed from the ammonia decomposition unit to the ammonia oxidizing unit.

In some further embodiments the apparatus for producing a gas mixture according to fifth aspect of the invention, further comprises means for feeding oxygen gas or other oxidants to the ammonia oxidizing unit.

An ammonia decomposition unit may be referred to as an ammonia cracking unit. In some embodiments, the ammonia decomposition unit and the ammonia oxidizing unit are contained in the same unit.

A single cracking/oxidation unit comprising the catalyst of the invention has the main advantage over existing commercial solutions, as it is less complex and less expensive and furthermore does not employ noble metals membrane for ammonia separation.

The use of the catalyst of the invention in a single unit comprising a cracking and an oxidation unit favours the complete integration of the two processes, i.e. the ammonia decomposition and ammonia removal from the produced gas mixture stream, as, e.g. heat for the exhaust of the ammonia decomposition may be used to heat the part of the unit where ammonia oxidation occurs. Thus, it provides a cost effective, energy efficient, simple, reliable and convenient alternative to noble metal membranes that are currently used for ammonia removal.

In a sixth aspect the invention relates to the use of an apparatus according to the fifth aspect of the invention for producing a gas mixture comprising hydrogen and nitrogen and ammonia gases below the equilibrium concentration of ammonia.

Trace amounts of ammonia in a hydrogen containing gas mixture may poison fuel cells and thus the use of an ammonia free gas feed for fuel cell is crucial for ensuring optimal fuel cell performance. In some embodiments the method according to the further aspect of the invention selectively removes ammonia from gas mixtures having a composition of at least 75% (vol %) of hydrogen gas and contains ammonia in ppm concentration.

In a further aspect, the invention relates to a method for selectively removing ammonia from gas mixtures, the method comprising:
  providing a flow of a gas mixture comprising hydrogen, nitrogen and ammonia gases over a catalyst according to the first aspect of the invention, thereby selectively removing said ammonia from the gas mixture.

In some embodiments, the removal of the ammonia gas reaches a level below the equilibrium concentration of ammonia in the gas mixture.

In an even further aspect, the invention relates to a method for manufacturing a catalyst according to the first aspect of the invention, the method comprising:
  impregnating the support with transition metal elements by contacting the support with a solution comprising the at least one transition metal elements, thereby producing an impregnated support;
  drying the impregnated support by heating or keeping the impregnated support at a desired temperature and for a specific period of time;
  reducing the impregnated support in reducing atmosphere at high temperature and for a specific period of time, thereby manufacturing said catalyst.

The catalyst may be prepared by impregnation, such as incipient wetness impregnation or capillary impregnation. The active metal precursor is dissolved in an aqueous or organic solution. The metal-containing solution obtained by dissolving the active metal precursor is added to a catalyst support.

In pore volume impregnation, the catalyst support contains the same pore volume as the volume of the solution that is put in contact with the catalyst. In this way, capillary action draws the solution into the pores. If the solution is added in excess of the support pore volume, this causes the solution transport to change from a capillary action process to a diffusion process. This is not desirable as the diffusion process is much slower.

The catalyst is then dried at room or higher temperature for a specific period of time, e.g. for 24 hours, thus the volatile components within the solution can evaporate, depositing the metal on the catalyst support surface. The maximum loading is generally limited by the solubility of the precursor in the solution. The concentration profile of the impregnated compound depends on the mass transfer conditions within the pores during impregnation and drying.

The catalyst is then reduced in reducing atmosphere, such as in hydrogen gas at high temperature, such as between 300 and 700° C., for a specific period of time, e.g. for 3 hours.

No pre-treatment is required in order to achieve catalyst activity and selectivity towards ammonia.

The first, second and third and other aspects and embodiments of the present invention may each be combined with any of the other aspects and embodiments.

These and other aspects of the invention will be apparent from and elucidated with reference to the embodiments described hereinafter.

BRIEF DESCRIPTION OF THE FIGURES

The methods and catalysts according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
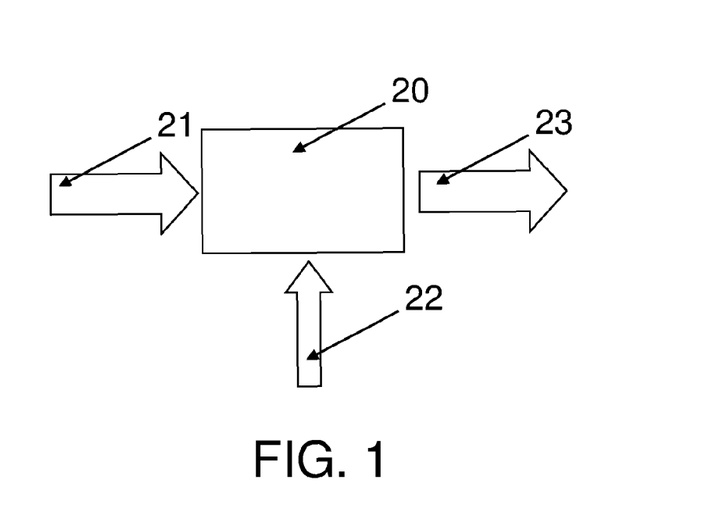
FIG. 1 is a graphic representation of the catalyst of the invention.

FIG. 1 is a graphic representation of the catalyst of the invention.

A gas mixture 21 of hydrogen, nitrogen and ammonia is flowed through a reactor catalyst bed 20 in presence of oxygen gas 22. The selective ammonia oxidation of the catalyst produces a gas mixture 23 at the outlet of the reactor, which contains hydrogen, water and nitrogen gases. The trace amounts of ammonia present in the gas mixture 21 that flows at the inlet of the reactor has been reduced, at least of an order of magnitude, if not completely removed, in the gas mixture 23 at the outlet of the reactor.

Figure 2:
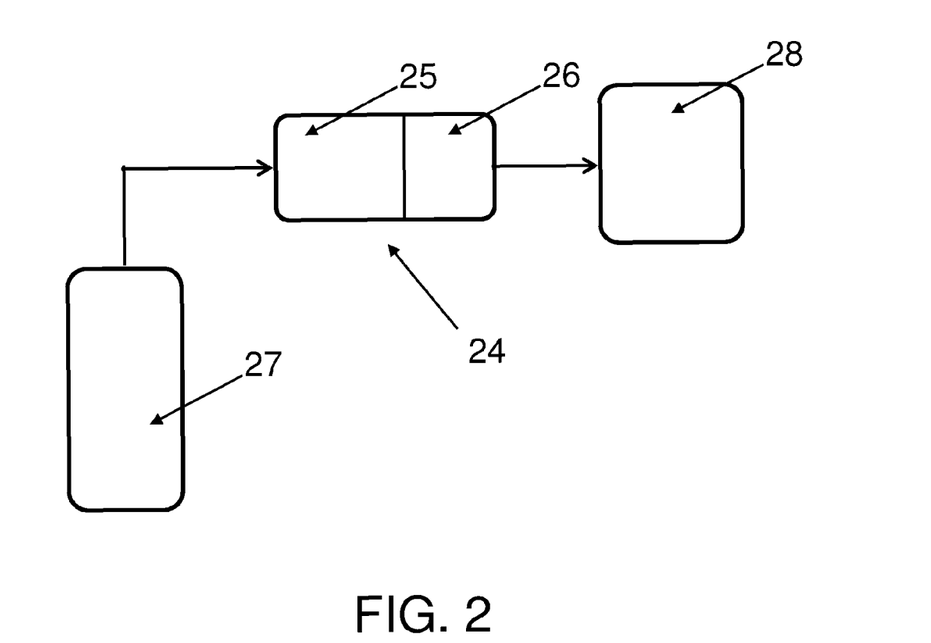
FIG. 2 is a graphic representation of a unit comprising a catalyst for decomposing ammonia and a catalyst for oxidizing ammonia.

FIG. 2 is a graphic representation of an ammonia unit 24, such as an ammonia cracker unit comprising a catalyst for decomposing ammonia 25 and a catalyst for oxidizing ammonia 26.

The catalyst 26 of the invention combined with a cracking catalyst 25 may provide great advantages when used in an apparatus for providing a hydrogen gas mixture having a high level of purity, i.e. where ammonia even in trace amounts has been removed. Furthermore, the presence of a catalyst for oxidizing ammonia 26 has the advantage of producing a humidified fuel cell feed at the outlet of the cracking unit. In some cases, hydrogen containing gas mixtures need to be humidified before being fed to low temperature fuel cells. By using the ammonia cracker unit according to one aspect of the invention, the humidification process is integrated in the cracking unit as the gas passing through the catalyst for oxidizing ammonia 26 is decomposed in nitrogen and water gas, thus humidifying the hydrogen gas containing mixture.

Ammonia is an excellent zero-carbon hydrogen gas carrier. Ammonia can be decomposed in a reactor, e.g. a cracker, at high temperature, providing a flow of hydrogen, nitrogen and ammonia gas. However, the hydrogen containing gas mixture cannot be used directly as a fuel for electricity production in, e.g. a low temperature fuel cell. Even low concentration of ammonia in the hydrogen gas containing mixture can cause poisoning of the fuel cell. Thus, traces of ammonia needs to be removed.

The use of the catalyst of the invention allows the manufacturing of a cracking unit where both ammonia decomposition and ammonia removal are accomplished within one apparatus.

By feeding ammonia 27 to the cracker unit 24 a gas feed for a fuel cell 28 may be produced.

Preparation Method for Pure Chromium Oxide

In this sol-gel method, 6 g of chromium (III) nitrate nonahydrate precursor, $Cr(NO_3)_3 \cdot 9H_2O$ (Sigma Aldrich, assay 99%) was poured into a teflon flask, and dissolved in 100 ml of 2-propanol (Fluka Analytical, assay 99.9%) using a magnetic stirrer at 450 rpm for 30 minutes. Then, 10 ml of propylene oxide (Sigma Aldrich, assay >99.5%) was added dropwise to the solution at room temperature, which was kept stirring for 2 h. The solution was left without agitation overnight leading to a gel formation. The gel was then dried at 75° C. inside an oven to remove the solvent and finally at 125° C. for 5 h, which resulted in a green Cr-based material. As final step, the $Cr_2O$ was obtained after calcination on a muffle oven at 350° C. for 1 h and at 500° C. for 2 h.

Preparation Method for 10 wt. % Cr Supported in $TiO_2$

Chromium (III) nitrate nonahydrate precursor, $Cr(NO_3)_3 \cdot 9H_2O$ (Sigma Aldrich, assay 99%) was added by the conventional wetness impregnation method to the $TiO_2$ rutile support (Sigma Aldrich, assay 99.99%). An aqueous solution of chromium (III) nitrate was prepared with the amount of chromium being calculated to achieve a nominal metal loading of 10 wt. %. The solution was added to the $TiO_2$ rutile powder, agitated for 2 h and left to dried at room temperature for 24 h. The obtained catalyst was then pretreated in-situ on the experimental set-up.

Figure 3:
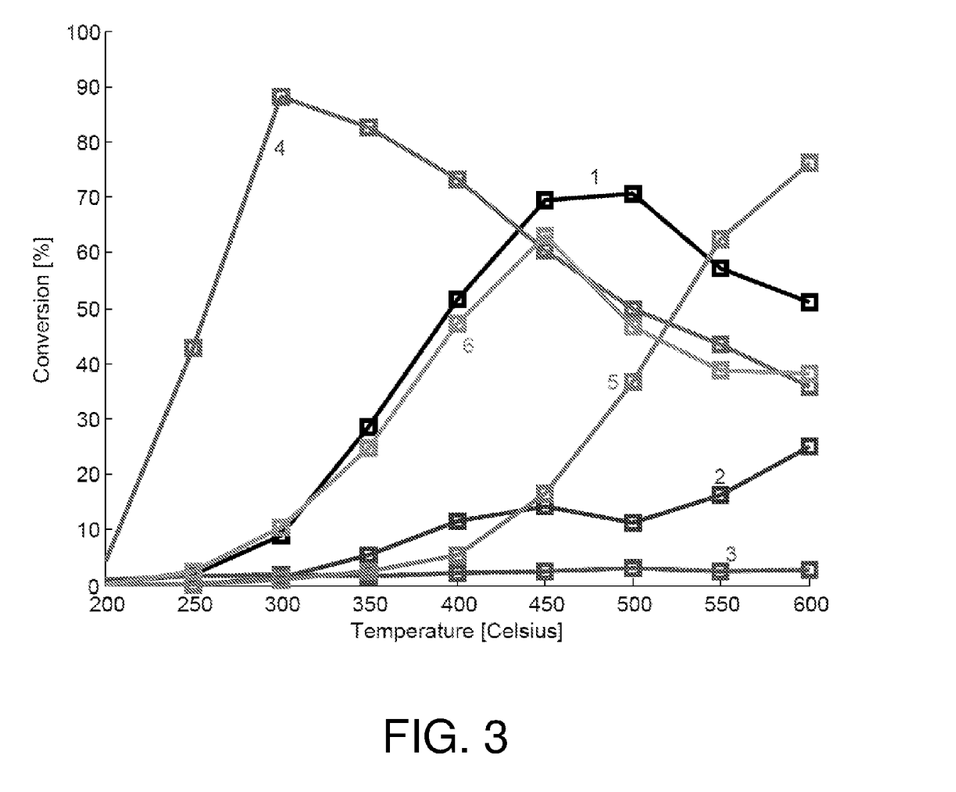
FIG. 3 is a plot showing the activities of different catalytic materials according to some embodiments of the invention.

FIG. 3 is a plot showing the activities of different catalytic materials according to some embodiments of the invention. FIG. 3 shows the conversion of ammonia gas in % as a function of the temperature in Celsius degrees for transition metal oxides supported on titania (anatase).

FIG. 3 shows the ammonia conversion of a stream of a gas mixture having 10% hydrogen gas and traces of ammonia (1000 ppm) and oxygen gas (1000 ppm) and argon as the rest over the catalyst supported on titanium dioxide for a total flow rate of 150 ml/min.

Among the materials, $CrOx/TiO_2$ 4 showed the maximum activity with around 90% conversion obtained at around 300° C. $MoOx/TiO_2$ 1 showed a maximum of around 70% conversion at around 500° C., $VOx/TiO_2$ 6 showed a maximum conversion of around 65% at 450° C. $WOx/TiO_2$ 5. $WOx/TiO_2$ also showed around 80% conversion at 600° C. $MnOx/TiO_2$ 3 and $ReOx/TiO_2$ 2 showed some activity (~5% conversion at 500° C.) but it was significantly lower than the other catalysts reported here.

Figure 4:
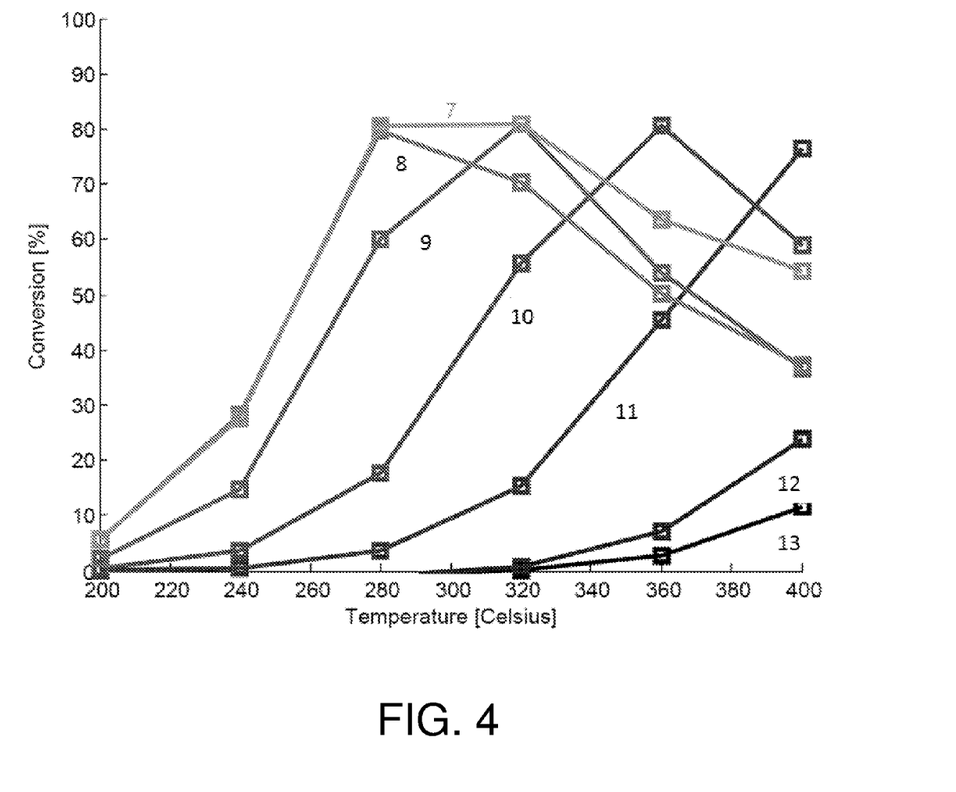
FIG. 4 is a plot showing the activities of different loading of $CrO_x$ on $TiO_2$ according to some embodiments of the invention.

FIG. 4 shows the activities of different loading of $CrO_x$ on $TiO_2$ (anatase) according to some embodiments of the invention, thus showing the effect of different amounts of $CrO_x$ on ammonia oxidation as a function of the temperature.

The gas mixture coating 65% $H_2$, 20% $N_2$, 500 ppm of ammonia gas, 2200 ppm of oxygen gas, and argon as the rest for a total flow of 150 ml/min.

From FIG. 4 it can be clearly seen that by increasing the amount of $CrO_x$, the temperature to obtain the highest conversion, i.e. 80% can be reduced. Indeed, for a catalyst having 25% $CrO_x$ on titania 7, 80% ammonia conversion can be obtained already at 280° C. Lower conversion is shown for 0.013% $CrO_x$ on titania 13, 0.13% $CrO_x$ on titania 12, 0.65% $CrO_x$ on titania 11, 1.3% $CrO_x$ on titania 10, 5% $CrO_x$ on titania 9 and 10% $CrO_x$ on titania 8.

Figure 5:
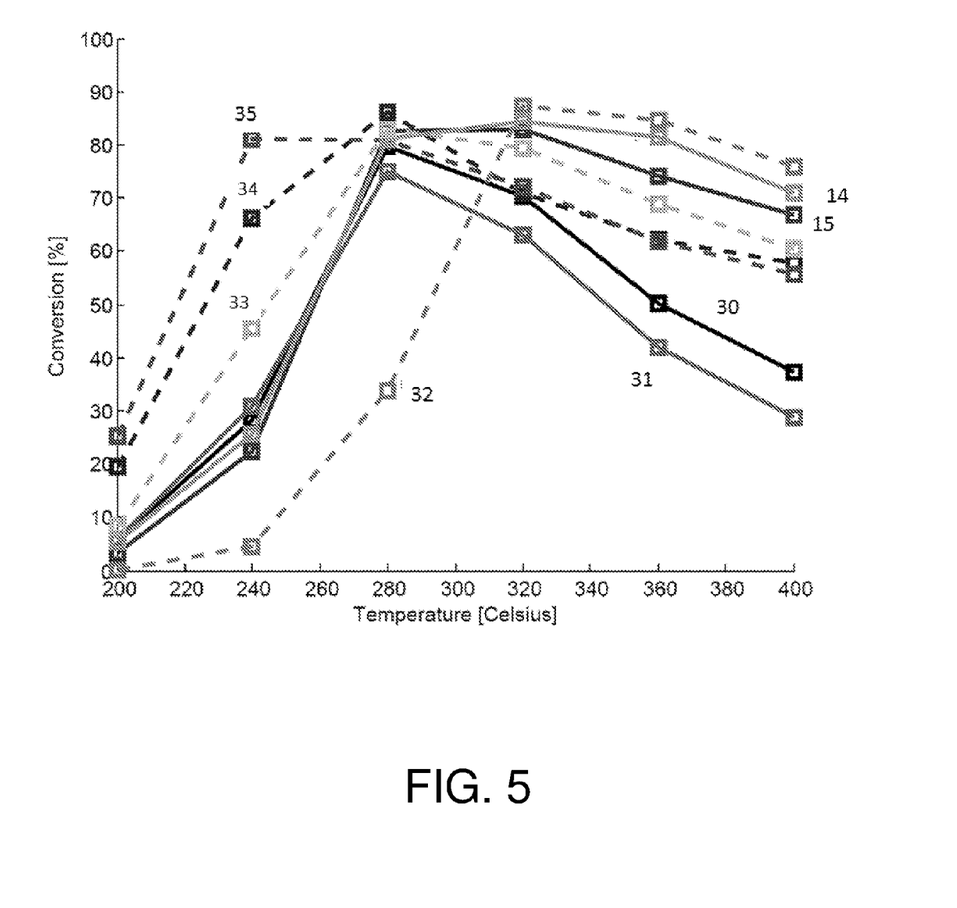
FIG. 5 is a plot showing the activities of $CrO_x$ on different supports according to some embodiments of the invention.

FIG. 5 is a plot showing the activities of different loading of $CrO_x$ on different supports, such as alumina+silica 15, titania (anatase) 30, titania (rutile) 35, ceria 2, zirconia 31, alumina 32, vanadia 33 or zeolite 14, according to some embodiments of the invention.

The catalyst shown in FIG. 5 comprises 10 wt. % of $CrO_x$ on different supports.

The gas mixture coating 65% $H_2$, 20% $N_2$, 500 ppm of ammonia gas, 2200 ppm of oxygen gas, and argon as the rest for a total flow of 150 ml/min.

From FIG. 5 it can be clearly seen that 10 wt. % of $CrO_x$ on titania in the rutile form 35 produces the highest ammonia conversion, i.e. 80 at a temperature of 240° C. For a 10% $CrO_x$ catalyst the highest ammonia conversion, i.e. 87% is produced on alumina support at 320° C.

Figure 6:
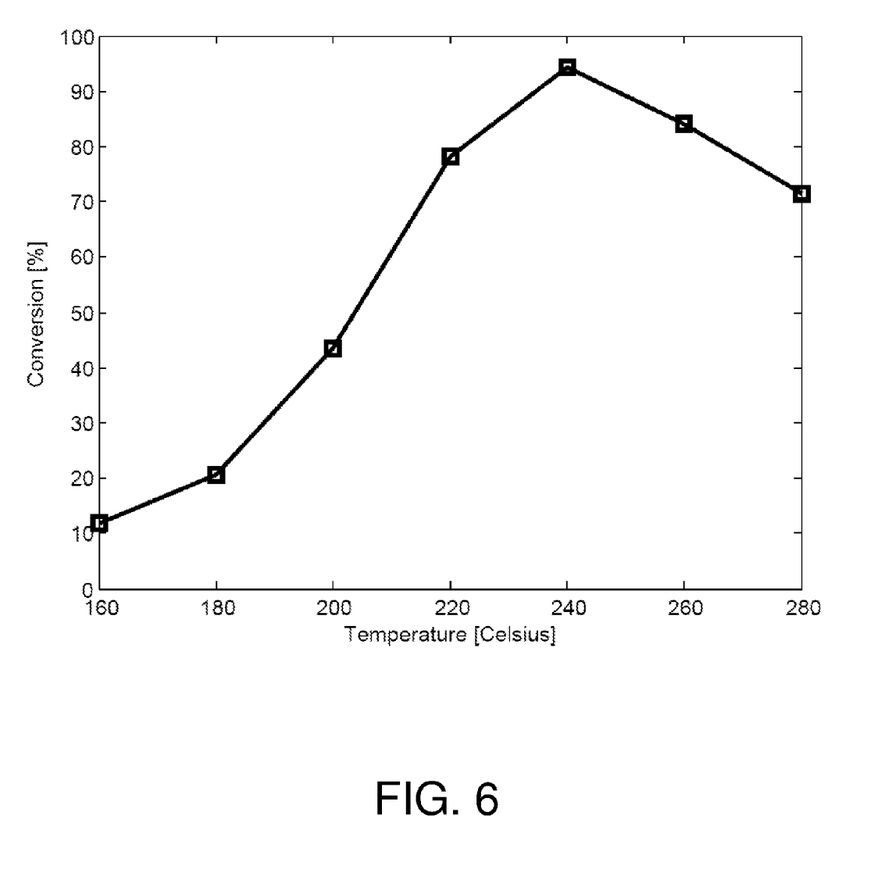
FIG. 6 is a plot showing the activities of $CrO_x$ on Titania (rutile) on ammonia oxidation according to some embodiments of the invention.

FIG. 6 is a plot showing the activities of $CrO_x$ on Titania (rutile) on ammonia oxidation according to some embodiments of the invention.

FIG. 6 shows the conversion of ammonia in a gas mixture flow having a composition of 65% $H_2$, 20% $N_2$, 100 ppm $NH_3$, gas and 600 ppm $O_2$ for a total flow of 150 ml/min.

The amount of catalyst was 50 mg, i.e. 70 wt. % Cr in $TiO_2$ (rutile). It can be noticed that at a temperature of 240° C., the conversion of ammonia gas reaches a maximum value.

Figure 7:
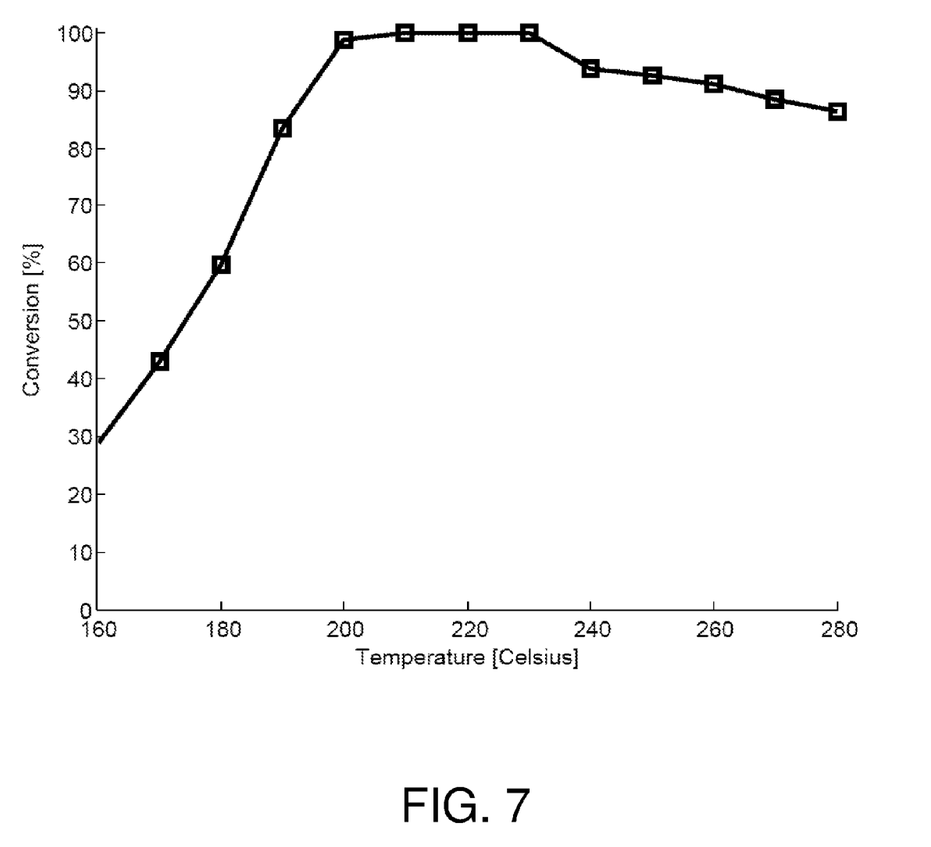
FIG. 7 is a plot showing the activities of unsupported $CrO_x$.

FIG. 7 is a plot showing the activities of unsupported $CrO_x$. FIG. 7 shows the conversion of ammonia in a gas mixture flow having a composition of 65% $H_2$, 20% $N_2$, 100 ppm $NH_3$, gas and 600 ppm $O_2$ for a total flow of 150 ml/min.

The amount of catalyst was 50 mg. It can be noticed that at a temperature between 200 and 230° C., the conversion of ammonia gas reaches a maximum value.

Figure 8:
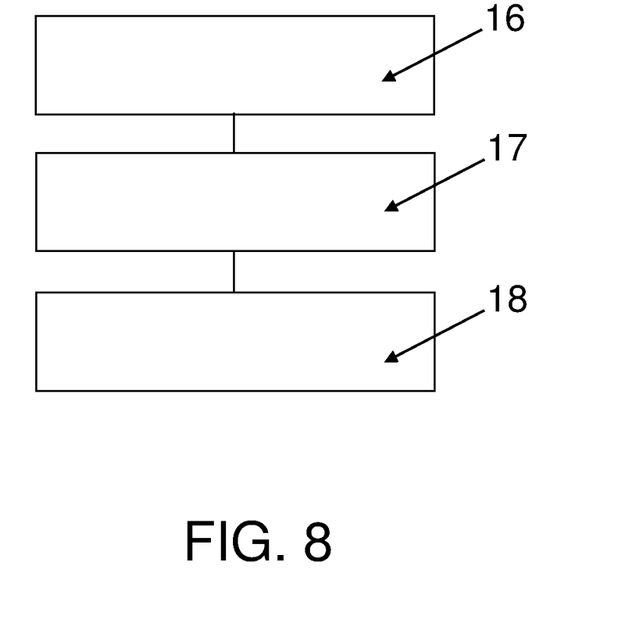
FIG. 8 is a flow-chart of a method of manufacturing according to some embodiments of the invention.

FIG. 8 is a flow-chart of a method for manufacturing a catalyst, according to some aspects of the invention.

The method for manufacturing a catalyst may comprise: impregnating 16 a support with transition metal elements by contacting the support with a solution comprising the metal elements, thereby producing an impregnated support; drying 17 the impregnated support by heating or keeping the impregnated support at a desired temperature for a specific period of time; reducing 18 the impregnated support in reducing atmosphere at high temperature and for a specific period of time, thereby manufacturing a catalyst.

Figure 9:
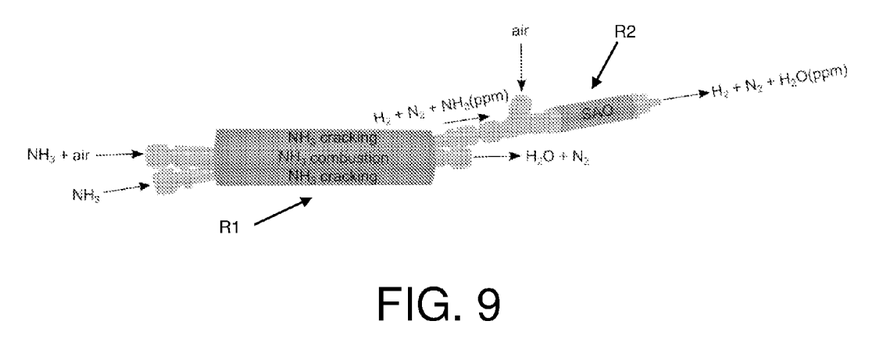
FIG. 9 is a graphic representation of the apparatus comprising an ammonia decomposition unit ($NH_3$ combustion and cracking) and an ammonia oxidizing unit (SAO) according some embodiments of the invention.

FIG. 9 is graphic representation of the apparatus comprising an ammonia decomposition unit ($NH_3$ combustion and cracking) and an ammonia oxidizing unit (SAO) according some embodiments of the invention.

Thus in one aspect, the invention relates to an apparatus for producing a gas mixture wherein the ammonia oxidizing unit is located downstream of the ammonia decomposition unit.

The apparatus of FIG. 9 produces a gas mixture comprising hydrogen and nitrogen gas as well as water in trace by selectively removing ammonia from gas mixtures comprising hydrogen and/or air and ammonia gas in trace, i.e. in ppm concentration.

As shown in FIG. 9 the apparatus according to some embodiments of the invention comprises an ammonia decomposition unit (R1) comprising a catalyst for decomposing ammonia and an ammonia oxidizing unit (R2) comprising a catalyst for oxidizing ammonia.

In the ammonia decomposition unit both ammonia combustion and cracking may occur. As shown in FIG. 9, R1 has two inlet and two outlets. A first inlet allows ammonia and air gas to enter the ammonia combustion chamber.

In the ammonia combustion chamber, ammonia combustion occurs according to the exothermic combustion reaction:

Following the combustion reaction, the nitrogen gas and water vapour produced leave the combustion chamber via a first outlet.

In the apparatus of FIG. 9, the ammonia decomposition unit comprises also a cracking chamber surrounding the combustion chamber. In this way, the heat produced by the combustion reaction is efficiently diffused to the cracking chamber.

A second inlet allows ammonia to enter the ammonia cracking chamber. In the cracking chamber, ammonia cracking occurs according to the endothermic cracking reaction:

Following the cracking reaction, nitrogen and hydrogen gas together with ammonia gas in ppm concentration leave the cracking chamber via a second outlet.

The output of the second outlet, together with air providing the necessary oxygen gas for the oxidation, is fed into a Selective Ammonia Oxidation (SAO) unit (R2). The SAO unit comprises a catalyst for oxidizing ammonia, which comprises at least one transition metal element supported on a support.

In some embodiments the SAO unit comprises a catalyst for oxidizing ammonia, which comprises at least one transition metal element not supported on a support.

In some embodiments the at least one transition metal element is Cr, Mo, W, V or a combination thereof.

The SAO unit selectively remove ammonia from gas mixtures comprising hydrogen and ammonia gas in ppm concentration.

At the outlet of the SAO unit, hydrogen and nitrogen gases together with water vapour in ppm concentration are released.

The air, oxygen gas or or other oxidant may be fed to the SAO unit via a further inlet, i.e. a third inlet upstream the SAO unit.

In the SAO unit, the output from the cracking chamber is mixed with air, and at the outlet of the SAO unit hydrogen and nitrogen gas together with ammonia in concentration in the area of 0.1 ppm. Thus, the concentration of ammonia in the gas mixture is reduced by the presence of the SAO from between 500-1000 ppm at the SAO unit inlet to 0.1 ppm at the SAO unit outlet.

Figure 10:
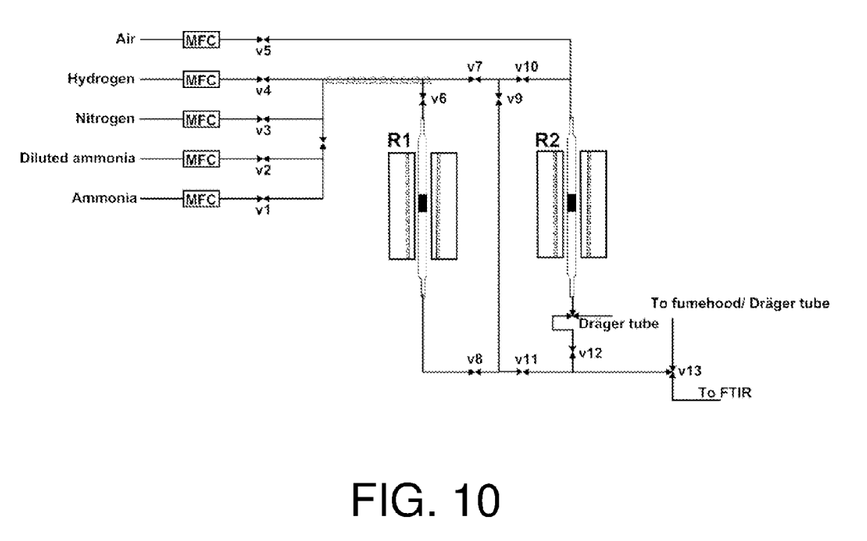
FIG. 10 is a graphic representation of the apparatus comprising an ammonia decomposition unit (R1) and an ammonia oxidizing unit (R2) according some embodiments of the invention.

FIG. 10 is graphic representation of the apparatus comprising an ammonia decomposition unit (R1) and an ammonia oxidizing unit (R2) according some embodiments of the invention.

The apparatus as in FIG. 10 comprises elements and connections only needed for the testing the performance of the SAO unit so as to be able to perform controlled experiments. At the outlet of R2 or R1 and R2 gas measurements can be performed via detector tubes, such as Drager tubes or through Fourier transform infrared spectroscopy (FTIR). For testing purposes, R1 and R2 may be run individually or in series.

Figure 11:
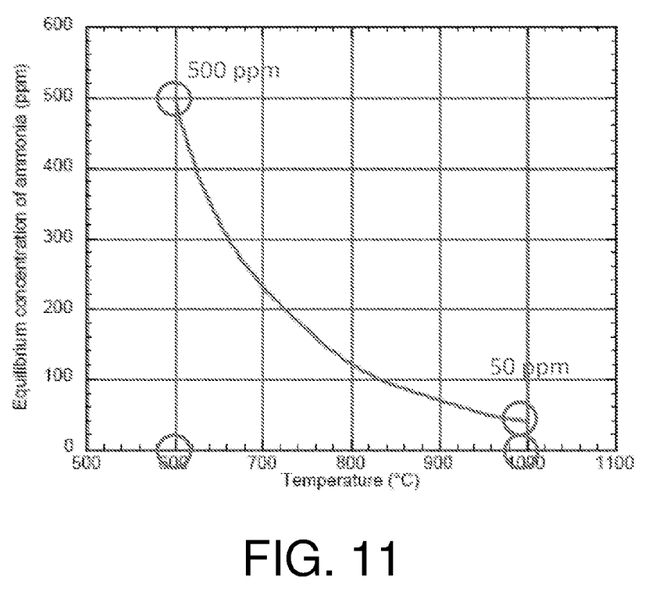
FIG. 11 is a plot showing the equilibrium concentration of ammonia as a function of temperature.

FIG. 11 is a plot showing the equilibrium concentration of ammonia as a function of temperature.

As discussed earlier the rate of the cracking or forward reaction (1) is in equal to the rate of the opposite or backwards reaction (2).

The equilibrium constant Kc depends on the temperature, thus the equilibrium concentrations may be shifted by increasing or decreasing the temperature.

FIG. 11 shows that at very low input of ammonia gas, e.g. 50 ppm, very high temperatures, e.g. 1000° C., are necessary. As shown by FIG. 11, at lower temperature, e.g. at 600° C., the equilibrium concentration of ammonia is higher, i.e. 500 ppm.

The catalyst of the invention is able to selectively remove ammonia from a gas mixture comprising hydrogen and nitrogen and ammonia gases below the equilibrium concentration of ammonia at any given temperature. Thus, for example, the catalyst of the invention is able to remove ammonia at level lower than 500 ppm at 600° C. or lower than 50 ppm at 1000° C.

In one aspect, the invention relates to the use of a catalyst in selectively removing ammonia from a gas mixture comprising hydrogen and ammonia gases below the equilibrium concentration of ammonia at any given temperature.

Figure 12:
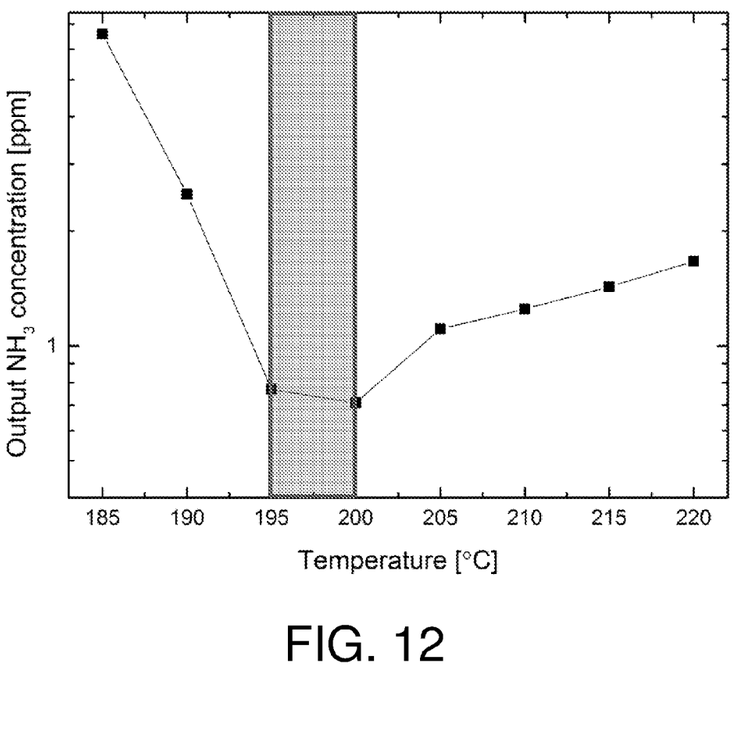
FIG. 12 is a plot showing the concentration of ammonia in ppm as a function of temperature at the output of an ammonia oxidizing unit (R2) according to some embodiments of the invention.

FIG. 12 is a plot showing the concentration of ammonia in ppm as a function of temperature at the output of an ammonia oxidizing unit (R2) according to some embodiments of the invention.

The concentration plotted as a function of temperature is for an ammonia oxidizing unit (R2) comprising a catalyst comprising 100 mg of $Cr_2O_3$ supported on a support. A gas mixture of $H_2/N2$ in a ration 75/25 together with 50 ppm of $NH_3$ gas is fed to R2 with a flow of 100 ml per min in presence of an overstochiometric amount of oxygen gas of six times, i.e. $O_2$: 6× overstoichiometric.

From the plot, it can be noticed that there is an optimal temperature range for selectively removing ammonia, i.e. between 195-200° C. while below 195° C. and above 200° C. the activity of the catalyst shows a steep drop.

Figure 13:
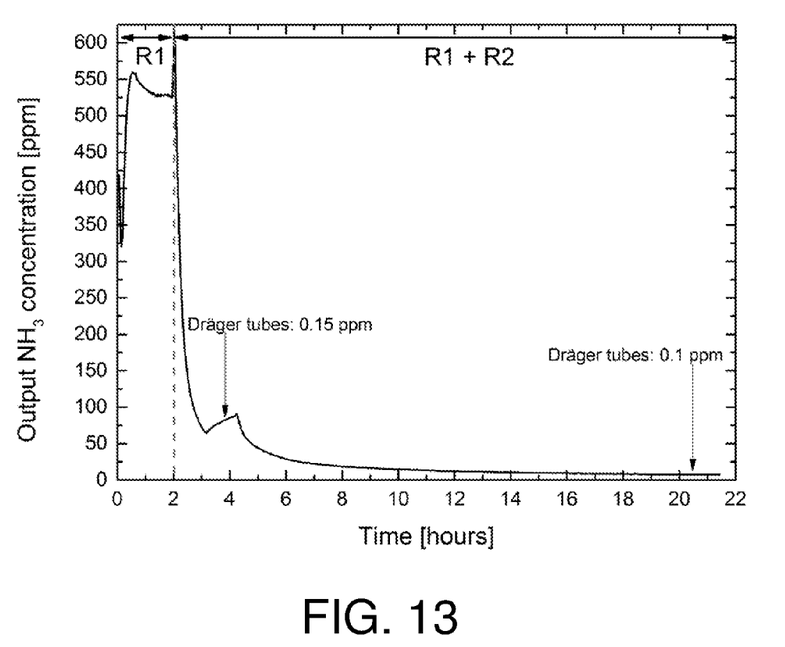
FIG. 13 is a plot showing the concentration of ammonia in ppm as a function of time at the output of an apparatus comprising an ammonia decomposition unit (R1) and an ammonia oxidizing unit (R2) according some embodiments of the invention.

FIG. 13 is a plot showing the concentration of ammonia in ppm as a function of time at the output of an apparatus comprising an ammonia decomposition unit (R1) and an ammonia oxidising unit (R2) according to some embodiments of the invention.

During the test, the temperature of R1 was set at 600° C. to produce a gas flow of 30 ml/min of a gas mixture containing 75/25 $H_2/N_2$ together with 500 ppm of $NH_3$. After two hours the gas mixture at the outlet of R1 was fed to R2 together with an overstochiometric amount of oxygen gas of six times, i.e. 6× overstochiometric. R2 temperature was set to be at 197° C. In R2 the catalyst was 100 mg of $Cr_2O_3$ in pellets and 100 mg of $Cr_2O_3$ in powder form.

It can be noticed that, in these conditions, the amount of ammonia was reduced from 550 ppm to 0.1 ppm.

Figure 14:
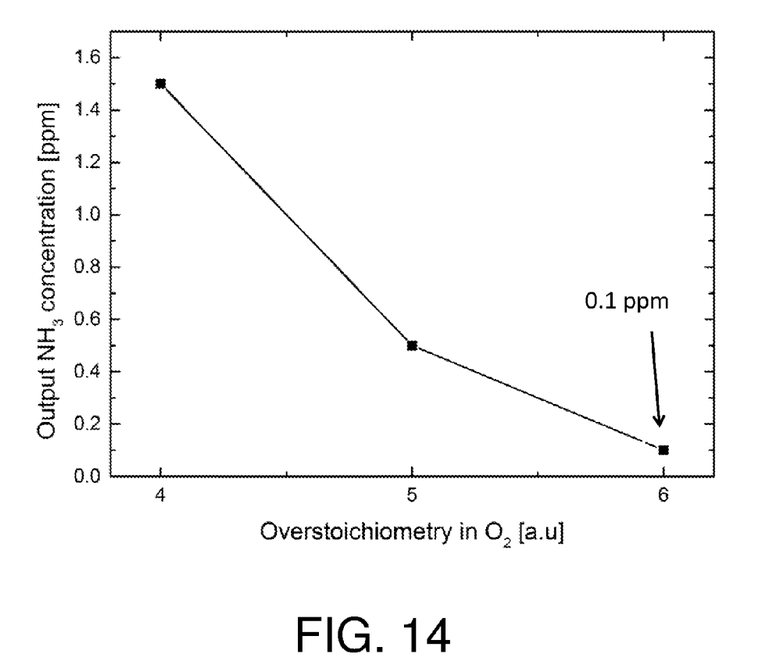
FIG. 14 is a plot showing the concentration of ammonia in ppm as a function of amount of oxygen gas used introduced into the apparatus according to some embodiments of the invention.

FIG. 14 is a plot showing the concentration of ammonia in ppm as a function of amount of oxygen gas used introduced into the apparatus according to some embodiments of the invention.

FIG. 14 shows that the 6× overstochiometric appears to be an optimal for the specific application as the concentration of ammonia gas is reduced to 0.1 ppm.

By using less oxygen gas, the output of ammonia concentration increases, e.g. with 4× overstochiometric the concentration of ammonia gas is reduced to 1.5 ppm of ammonia gas, thus the catalyst is less active with an overstochiometry lower than 6×.

However, it can be foreseen that improvements of the performance of the catalyst would lead to the use of stochimetric amount of oxygen gas. Thus it is expected that the need of an overstochiometry of oxygen gas will not be necessary to achieve the low concentration of ammonia shown by the experiment above.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention also relates to the following items:

1. Use of a catalyst, said catalyst comprising Cr, Mo, W, V or a combination thereof for selectively removing ammonia from gas mixtures comprising hydrogen and ammonia gas in ppm concentration, in selectively removing ammonia from a gas mixture comprising hydrogen and ammonia gases and containing ammonia in ppm concentration.

2. Use of a catalyst according to item 1, wherein said Cr, Mo, W, V or a combination thereof is supported on a support.

3. Use of a catalyst, according to any of the preceding items, in selectively removing ammonia from a gas mixture having a composition of 3:1 hydrogen to nitrogen ratio and containing ammonia in ppm concentration.

4. Use of a catalyst according to any of the preceding items, wherein said support is zeolite, titania, alumina, zirconia or ceria.

5. Use of a catalyst, according to any of the preceding items, in selectively removing ammonia from a gas mixture comprising hydrogen and ammonia gases below the equilibrium concentration of ammonia at any given temperature.

6. Use of a catalyst, according to any of the preceding items, in selectively removing ammonia from a gas mixture having a composition of at least 75 vol % of hydrogen gas and containing ammonia in ppm concentration.

7. Use of a catalyst, according to any of the preceding items, wherein the concentration of ammonia is lower than 1000 ppm.

8. Use of a catalyst, according to any of the preceding items, wherein the concentration of ammonia is lower than 500 ppm.

9. Use of a catalyst, according to any of the preceding items, wherein the concentration of ammonia is between 10 and 500 ppm.

10. An apparatus for producing a gas mixture comprising hydrogen and nitrogen gas, said apparatus comprising:
    an ammonia decomposition unit comprising a catalyst for decomposing ammonia;
    an ammonia oxidizing unit comprising a catalyst for oxidizing ammonia, wherein said catalyst for oxidizing ammonia is a catalyst comprising at least one transition metal element for selectively removing ammonia from gas mixtures comprising hydrogen and ammonia gas in ppm concentration, wherein said at least one transition metal element is supported on a support; wherein said at least one transition metal element is Cr, Mo, W, V or a combination thereof
further comprising means for feeding oxygen gas or other oxidant to said ammonia oxidizing unit.

11. An apparatus for producing a gas mixture according to item 10, wherein said ammonia oxidizing unit is located downstream of the ammonia decomposition unit.

12. Use of a catalyst in an ammonia oxidizing unit in an apparatus according to any of the preceding items 10-11, in selectively removing ammonia from a gas mixture comprising hydrogen and ammonia gases.

13. Use of a catalyst in an ammonia oxidizing unit in an apparatus according to any of the preceding items 10-11, in selectively removing ammonia from a gas mixture comprising hydrogen and ammonia gases below the equilibrium concentration of ammonia at any given temperature.

14. Use of a catalyst in an ammonia oxidizing unit in an apparatus according to any of the preceding items 10-11, in selectively removing ammonia from a gas mixture having a composition of 3:1 hydrogen to nitrogen ratio and containing ammonia in ppm concentration.

15. Use of a catalyst in an ammonia oxidizing unit in an apparatus according to any of the preceding items 10-11, in selectively removing ammonia from a gas mixture having a composition of 3:1 hydrogen to nitrogen ratio and containing ammonia in ppm concentration, wherein the concentration of ammonia is lower than 1000 ppm.

16. Use of a catalyst in an ammonia oxidizing unit in an apparatus according to any of the preceding items 10-11, in selectively removing ammonia from a gas mixture having a composition of 3:1 hydrogen to nitrogen ratio and containing ammonia in ppm concentration, wherein the concentration of ammonia is lower than 500 ppm.

17. Use of a catalyst in an ammonia oxidizing unit in an apparatus according to any of the preceding items 10-11, in selectively removing ammonia from a gas mixture having a composition of 3:1 hydrogen to nitrogen ratio and containing ammonia in ppm concentration, wherein the concentration of ammonia is between 10 and 500 ppm. 18. Use of an apparatus according to any of the preceding items 10-11 for producing a gas mixture comprising hydrogen and nitrogen and ammonia gases below the equilibrium concentration of ammonia at any given temperature.

19. Use of an apparatus according to any of the preceding items 10-11, for selectively removing ammonia from a gas mixture having a composition of 3:1 hydrogen to nitrogen ratio and containing ammonia in ppm concentration.

20. Use of an apparatus according to any of the preceding items, for selectively removing ammonia from a gas mixture having a composition of 3:1 hydrogen to nitrogen ratio and containing ammonia in ppm concentration, wherein the concentration of ammonia is lower than 1000 ppm.

21. Use of an apparatus according to any of the preceding items 10-11, for selectively removing ammonia from a gas mixture having a composition of 3:1 hydrogen to nitrogen ratio and containing ammonia in ppm concentration, wherein the concentration of ammonia is lower than 500 ppm.

22. Use of an apparatus according to any of the preceding items 10-11, for selectively removing ammonia from a gas mixture having a composition of 3:1 hydrogen to nitrogen ratio and containing ammonia in ppm concentration, wherein the concentration of ammonia is between 10 and 500 ppm.

The invention claimed is:

1. An apparatus for producing a gas mixture comprising hydrogen and nitrogen gas, said apparatus comprising:
   an ammonia decomposition unit comprising a catalyst for decomposing ammonia;
   an ammonia oxidizing unit comprising a selective catalyst oxidizing ammonia, wherein said catalyst oxidizing ammonia is a catalyst comprising at least one transition metal element configured to selectively remove ammonia from gas mixtures comprising hydrogen and ammonia gas, wherein the gas mixtures comprise ammonia at a concentration lower than 1000 ppm, wherein said at least one transition metal element is supported on a support; wherein said at least one transition metal element is Cr, Mo, W, or V or a combination thereof further comprising a feed to said ammonia oxidizing unit configured to introduce oxygen gas or an oxidant.

2. The apparatus for producing a gas mixture according to claim 1, wherein said ammonia oxidizing unit is located downstream of the ammonia decomposition unit.

3. A method of using a catalyst to oxidize ammonia comprising:
   selectively removing ammonia from a gas mixture comprising hydrogen and ammonia gases with a catalyst comprising at least one transition metal element supported on a support, wherein said at least one transition metal element is Cr, Mo, W, or V or a combination thereof, and wherein said catalyst is incorporated in an ammonia oxidizing unit present in an apparatus further comprising an ammonia decomposition unit, and a feed to said ammonia oxidizing unit configured to introduce oxygen gas or an oxidant.

4. The method of claim 3, comprising selectively removing ammonia from a gas mixture comprising hydrogen and ammonia gases below the equilibrium concentration of ammonia at any given temperature.

5. The method of claim 3, comprising selectively removing ammonia from a gas mixture having a composition of 3:1 hydrogen to nitrogen ratio and wherein the concentration of ammonia is lower than 1000 ppm.

6. The method of claim 5, comprising selectively removing ammonia from a gas mixture having a composition of 3:1 hydrogen to nitrogen ratio and containing ammonia in ppm concentration, wherein the concentration of ammonia is lower than 500 ppm.

7. The method of claim 5, comprising selectively removing ammonia from a gas mixture having a composition of 3:1 hydrogen to nitrogen ratio and containing ammonia in ppm concentration, wherein the concentration of ammonia is between 10 and 500 ppm.

8. A method of using the apparatus for producing a gas mixture according to claim 1, comprising selectively removing ammonia from a gas mixture comprising hydrogen and ammonia gases in the apparatus of claim 1.

9. The method of claim 8 comprising, selectively removing ammonia from a gas mixture having a composition of 3:1 hydrogen to nitrogen ratio and wherein the concentration of ammonia is lower than 1000 ppm.

10. The method of claim 8 comprising, selectively removing ammonia from a gas mixture having a composition of 3:1 hydrogen to nitrogen ratio and containing ammonia in ppm concentration, wherein the concentration of ammonia is lower than 500 ppm.

11. The method of claim 8 comprising, selectively removing ammonia from a gas mixture having a composition of 3:1 hydrogen to nitrogen ratio and containing ammonia in ppm concentration, wherein the concentration of ammonia is between 10 and 500 ppm.

12. A method for selectively removing ammonia from gas mixtures, the method comprising:
   providing a flow of a gas mixture comprising hydrogen, nitrogen and ammonia gases over a catalyst, wherein said catalyst comprises at least one transition metal element comprising hydrogen and ammonia gas in ppm concentration, wherein said at least one transition metal element is supported on a support; and wherein said at least one transition metal element is Cr, Mo, W, or V or a combination thereof, thereby selectively removing said ammonia from said gas mixture, said ammonia being present in ppm concentration.

13. The method for selectively removing ammonia from gas mixtures according to claim 12, wherein said gas mixture has a composition of at least 75 vol % of hydrogen gas and ammonia in ppm concentration.

14. The method for selectively removing ammonia from gas mixtures according to claim 12, wherein the concentration of ammonia is lower than 1000 ppm.

15. The method for selectively removing ammonia from gas mixtures according to claim 12, wherein the concentration of ammonia is lower than 500 ppm.

16. The method for selectively removing ammonia from gas mixtures according to claim 12, wherein the concentration of ammonia is between 10 and 500 ppm.

* * * * *